United States Patent
Imbeni et al.

(10) Patent No.: US 6,876,690 B1
(45) Date of Patent: Apr. 5, 2005

(54) METHOD, SYSTEM, APPARATUS AND COMPUTER PROGRAM IN A TELECOMMUNICATION SYSTEM

(75) Inventors: Davide Imbeni, Modena (IT); Riccardo De Bernardi, Monte San Pietro (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 776 days.

(21) Appl. No.: 09/707,914

(22) Filed: Nov. 8, 2000

(30) Foreign Application Priority Data

Nov. 9, 1999 (EP) .............................. 99850166

(51) Int. Cl.[7] .......................... H04B 15/00; H04K 1/00; H04L 27/30
(52) U.S. Cl. ...................... 375/130; 370/203; 370/468
(58) Field of Search ................................ 370/206, 208, 370/347, 341, 342, 468, 442, 203; 375/130, 140

(56) References Cited

U.S. PATENT DOCUMENTS

| | | | | |
|---|---|---|---|---|
| 6,163,524 A | * | 12/2000 | Magnusson et al. ........ | 370/208 |
| 6,233,231 B1 | * | 5/2001 | Felix et al. ................. | 370/335 |
| 6,333,936 B1 | | 12/2001 | Johansson et al. | |
| 6,400,755 B1 | * | 6/2002 | Harris et al. ............... | 375/146 |
| 6,466,559 B1 | | 10/2002 | Johansson et al. | |
| 6,560,194 B1 | * | 5/2003 | Gourgue et al. ............ | 370/203 |

FOREIGN PATENT DOCUMENTS

| | | |
|---|---|---|
| EP | 0 814 581 A | 12/1997 |
| EP | 0 878 930 A | 11/1998 |
| EP | 0 994 593 A | 4/2000 |
| EP | 1 035 676 A | 9/2000 |
| WO | 95/03652 | 2/1995 |

* cited by examiner

*Primary Examiner*—Jean B. Corrielus
(74) *Attorney, Agent, or Firm*—Nixon & Vanderhye P.C.

(57) ABSTRACT

The invention is concerned with a system for modulating an information signal in a telecommunication system. The communication system makes use of spreading codes in the modulation to discriminate between user signals. The codes are allocated for incoming requests by selection from one or more code structures having codes of different bit rates. The system is characterized by the steps of noting the bit rate of a code to be allocated for an incoming request, determination of the availability of the different codes having the desired bit rate, and allocating a code in accordance with pre-selected rules by taking the availability of the different codes into consideration in a way leading to an optimal use of the code structure(s). The apparatus of the invention comprises means for performing the system of the invention. The algorithm of the invention performs the allocation system of the invention in from of a computer program in accordance with certain rules.

30 Claims, 6 Drawing Sheets

METHOD, SYSTEM, APPARATUS AND COMPUTER PROGRAM IN A TELECOMMUNICATION SYSTEM

TECHNICAL FIELD

The present invention generally relates to a method and a system for modulating an information signal in a telecommunication system, for code allocation in CDMA systems using codes of different bit rates. The invention also relates to a computer program used in carrying out the method of the invention.

More particularly, the invention relates to a method and a system for modulating an information signal in a telecommunication system, in which spreading codes are used for discriminating between user signals, sand codes being allocated for incoming call requests by selecting them from one or more code structures having codes of different bit rates.

BACKGROUND ART

There exist different channel access methods for sending and receiving digital signals. In TDMA, Tire Division Multiple Access, a channel consists of a time slot in a periodic train of time intervals over the same frequency. In FDMA, Frequency Division Multiple Access, a communication channel as a single radio frequency band. Interference with adjacent channels is limited by the use of band pass filters which only pass signal energy within the specified frequency band. In contrast, CDMA, Code Division Multiple Access, allows signals to overlap in both time and frequency. Thus, several CDMA signals can share the same frequency band, but the CDMA receiver can also operate at several frequency bands.

Within the CDMA technique simultaneous connections can thus make use of a common frequency band. The selection, i.e. discrimination, between the des red signal and other signals is carried out by suitable signal processing, which is based on the desired signal being coded with a different code than other signals. The radio channels in a CDMA system are thus obtained by using different codes for each channel. Typically, the channels are obtained by using binary PN code sequences.

The transmitted information in the COMA radio signal is coded (spread) by a specific spreading code in the transmitter. At the receiving end, the coded information is decoded (despread) by correlating with the same specific spreading code again or by filtering the received information in a matched filter.

Second generation mobile network systems, wherein CDMA is used, such as IS-95, were primarily designed for transferring speech signals. The CDMA frequency band used in such systems was limited in comparison with the wide band CDMA system, WCDMA, which will be used in the third generation mobile system, UMTS, for transferring different services with signals of a wide spectrum of bit rates, such as speech, video and other services.

In WCDMA systems, user channels can be assigned binary code sequences of varying length based on the data rate of each channel. This allows for different services, e.g. speech, video, data etc. Orthogonal codes are codes that do not correlate to each other at a given time offset. Using such codes will therefore discriminate desired channels and the use of orthogonal codes will reduce the interference. Normally, the interference will not be completely eliminated as e.g. time dispersion will partly destroy the orthogonality between signals coded with orthogonal codes.

Different code structures exist, in which all available codes in a system are arranged, usually after the bit rate they provide. Examples of code structure systems used in WCDMA are e.g. the OVSF, Orthogonal Variable Spreading Factor, codes, explained in the following. One way of creating OVSF codes is by means of Walsh codes of different lengths, i.e. different spreading factors.

In the international patent application WO 9503652, user channels are assigned binary Walsh code sequences of varying length based on the data rate of each channel.

The lowest possible order (i.e. first order) of such a code, called a root code, has a code length of one bit, and may be equivalent to "0". A tree of Walsh sequences may be envisioned as a set of interconnected nodes each having two branches, where all of the nodes may be traced back to the root node. Then the two branches from this root node will be connected to a pair of nodes defined by Walsh sequences "00" and "01", which are called second order codes. This process can be continued by deriving a Walsh function matrix by branching the node "00" into the nodes "0000" and "0011", and branching the node "01," to "0101" and "0110" which are called third order codes. The Walsh sequence defining a node of the tree branching from a given node is not orthogonal to the Walsh sequence associated with that node. Therefore, associated nodes of different orders do not discriminate channels and branch-connected codes may not be simultaneously used. Any other Walsh sequences defining nodes not connected to the given node can be simultaneously used as codes to define other mobile channels.

Figure 1:
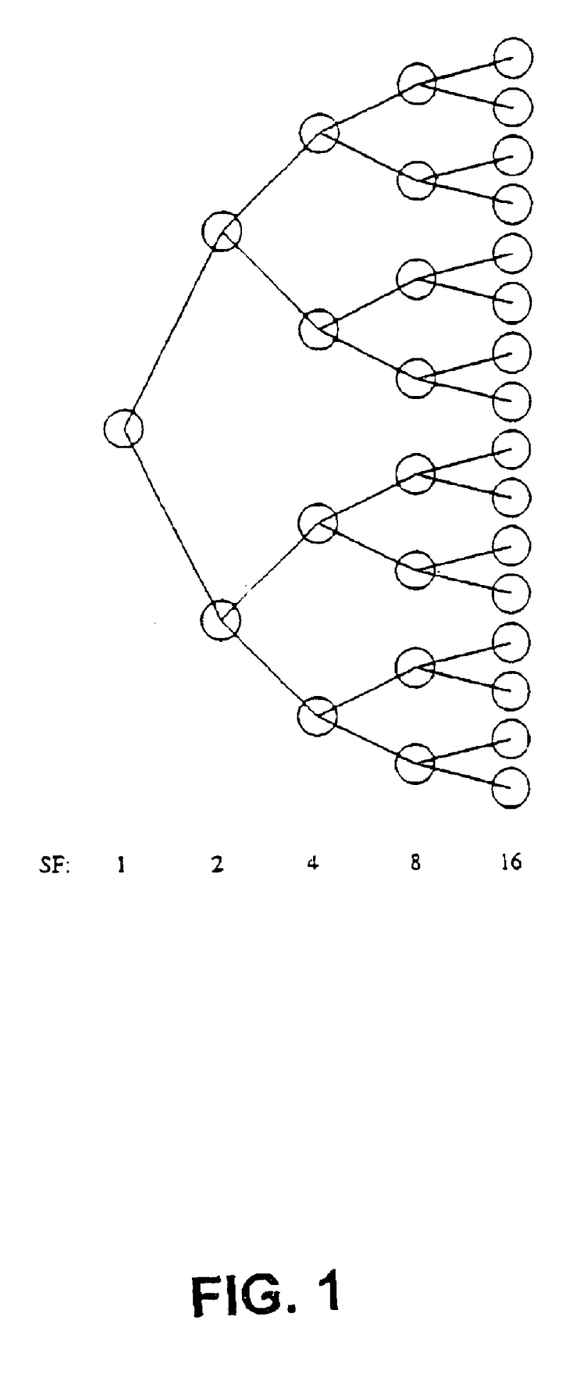
FIG. 1 illustrates an example of an OVSF code tree structure.

The amount of codes to be allocated is thus restricted, as the number of available codes for a specific code length is mathematically limited. OVSF codes are downlink channelisation codes used in WCDMA that preserves the orthogonality between channels of different rates and spreading factors. The code structure of the OVSF codes are described by means of a code tree structure, which is illustrated in FIG. 1 and will be described in more detail later on. In the code tree structure services requiring codes of greater length, like speech, are to the right of the code tree, whereas more requiring services (i.e. requiring higher data rates), like video, need codes of shorter lengths as seen to the left in the code tree. In cell able to provide different kinds of services, codes of different spreading factors and rates will be requested, corresponding to different services.

Prior art solutions for allocation of codes in CDMA systems, able to provide speech and other services, in which the codes to be allocated are selected systematically, do not seem to exist as far as known. If the allocation of codes is performed by just signing the first available free code without any further rules, it represents the simplest way to allocate such code requests, the so called sequential mode.

Problems in using such sequential code allocation methods in wide band systems using several code levels (orders) arise upon releasing the used codes when older calls expire, which results in holes in the code structure of busy codes. Even if the maximum total bit rate available has not been reached (i.e. there are still some free codes), new high bit rate call requests might rot be satisfied unless used lower bit rate codes are reallocated in order to free a higher bit rate code of requested level. Since reallocations need signalling between the base stations and the involved mobile stations, critical situations might arise in high load conditions.

In the international patent application WO 95/03652 (QUALCOMM INCORPORATED), proposing a code allocation system for wide band CDMA systems, this problem has been discussed and the idea of minimizing the number of disqualified shorter-length codes is presented. The document states the opportunity or assigning codes that are related to busy codes, in order to minimize the fragmentation of the tree and suggest to allocate slow codes that are related to unavailable fast codes. Furthermore, reallocation is presented to increase the availability of fast codes. A precise algorithm to achieve this result as, however, not presented and the problem of future availability is not taken into account. Thus, there is a need for such an algorithm,.

One object of the invention is to develop a method, which minimizes the signalling in the system when allocating codes in a multi speed system.

Another object is to reduce the setup delay when allocating new calls.

A third object is to develop a method, which maximizes the amount of available free codes at different levels.

A fourth object is to develop a method for reallocation when no free codes are available, while minimizing the need for such reallocation.

A fifth object of the invention is to develop a method attaining that a minimum of higher-rate codes become unavailable by using an algorithm to carry out the allocation of the invention.

SUMMARY OF THE INVENTION

The method and system of the invention is characterized by steps and means, respectively, for noting the bit rate of a code to be allocated for an incoming request, determining the availability of the different codes having the desired bit rate, and allocating a code in accordance with pre-selected rules by taking the availability of the different codes into consideration in a way leading to an optimal use of the code structure.

The apparatus of the invention comprises means for performing the method of the invention.

The algorithm of the invention performs the allocation method of the invention in form of a computer program in accordance with certain rules.

The codes allocated for a given service request also depend on the traffic situation, the number of available codes and the requested bit rate of the code.

A condition for the allocation of the code is that the traffic situation allows the allocation so that the maximum transfer capacity of the system is not exceeded. If a code system with available transfer capacity is not available, the incoming request has to be blocked.

If only one free code of the requested level exists, that code is allocated for the request.

If more than one free code of the requested level exist, the algorithm of the invention used for allocation of the codes, chooses the code to be allocated in accordance with pre-selected rules prioritizing some codes in front of others.

If there, however, does not exist any free codes of the requested level but there are enough transfer capacity left in the system for a specific service request (some free codes), the reallocation algorithm of the invention performs a reallocation of already assigned codes to get a free code of the requested level. The incoming request is in this case assigned to a code, which is unavailable because of used related longer length codes. The reallocation of these used and already assigned codes is then carried out according to the sane rules as the allocation of a code for a new incoming request.

The incoming request can be any service, used in a WCDMA system, for example speech, data, video etc.

By means of the invention, an algorithm can be indicated, that, given an offered traffic statistics, minimizes the number of cases in which reallocation is needed in order to assign new codes or the total number of changes of already allocated codes. Consequently, the total signalling in the system will be decreased.

In the following the invention is described by means of a block diagram and examples. The rules according to which some codes are prioritized in front of others are explained by means of the block diagram and the examples. The invention is, however, not restricted to the details of the following description, which is presented for illustrative purposes only. The idea of the invention, which is defined in the claims, can e.g. be extended to other code system, structures defining different levels of codes than the OVFS code tree, even if this particular structure is described in the Figures.

BRIEF DESCRIPTION OF DRAWINGS

The invention will now be described more closely with reference to the drawing, in which.

DETAILED DESCRIPTION

QVSF codes are defined by a code structure illustrated in FIG. 1. Each node of the tree corresponds to a code, the spreading factor (SF) and bit rate of which are defined by its SF level 1, 2, 4, 8 or 16. The code levels may also, below, generally be referred to as levels k to make the following description easier. The relationship between SF-levels and k-levels will then be such that SF-levels 1, 2, 4, 8 ard 16 correspond to k-levels 0, 1, 2, 3, 4 respectively. A code of a given level has a given length and thus corresponds to a given spreading factor and a given bit rate. The node representing the lowest SF-level, highest bit rate, and lowest k-level, is called the root, i.e. the node to the very left in FIG. 1.

One code is free, and can be assigned to an incoming call, if no code in its subtree, i.e. the subtree to which the code in question may be regarded as root, and in the branch that leads from it to the tree root, is busy.

It is possible to define different levels of occupation for one code (node) A code can be busy, unavailable or free, depending on the degree of occupation.

A code is busy, if the code itself, or a higher bit rate code in the path from the code to the root, already has been assigned to a downlink connection. A busy code is said to be used if it is directly assigned for a downlink connection.

A code is unavailable, if one or more codes in the subtree of the code are busy. An occupation or unavailability level can be defined in this case as the fraction of the total bit rate of the subtree assigned to used codes. If the whole subtree is used, the fully unavailable code can be considered busy.

All remaining codes, which are neither busy nor unavailable are free.

A shorter length, or higher bit rate code from which two codes of double length descend may here be called father of these codes and the descendant codes may be called sons. Codes having the same father are brother codes.

The code tree structure should be understood to imply that services requiring longer length codes, like speech, are located on the right hand side of the code tree, whereas more requiring services, like video, needing codes of shorter lengths, i.e. higher bit rates, are on the left hand side of the code tree.

In order to fully appreciate nd understand the description with reference to the drawings, given further below, some shortcomings of prior art, as well as the way used by the invention to eliminate these, will be summarised in short as follows.

Problems with allocation arise as older calls expire, releasing the used codes and determining holes in the tree of busy codes.

Ever if the maximum total bit rate has not been reached, in such a situation new high bit rate call requests might not be satisfied unless busy codes are reallocated in order to free a subtree of suitable level.

Since reallocations need signalling between the RS and the involved MSs, their number should be kept as low as possible, in order to avoid critical situations in high load conditions.

The invention is based on the realisation that, as seer against the above given background, it would be of interest to indicate an allocation algorithm that, given an offered traffic statistics, minimizes the number of cases in which reallocation is needed in order to assign new codes. In the same way, once reallocation is decided, it is worth finding an algorithm that minimizes the number of total actual code changes.

In accordance with the invention this new algorithm for code allocation aims at preserving the highest possible number of higher level available codes. In case of multiple choices, codes maximizing the probability, of future release of a higher level code are preferred.

The algorithm is based on the following rules.

Assume one code of level k has to be allocated, where $k=\log_2(SF)$ is the base 2 logarithm of the Spreading Factor.

The code to be assigned is obviously belonging to the set of free codes of level k.

In this set, the codes whose father's uravailability level is higher should be preferred.

This defines a new subset in which the suitable codes should be found. If more than one code exists in that set, the unavailability level of the grand-father codes, i.e. fathers of fathers should be checked, and once again higher Figures be preferred.

The procedure should end when one set is found including only one code, or when the root code is reached. In that last case the first code in the resulting set will be chosen.

If the incoming call leads to exceed the maximum total bit rate of the root code it shall be blocked or assigned to another code. In CDMA this can be provided by another scrambling code assigned to the If the maximum total bit rate is not exceeded, and no level k free code exists, reallocation is needed.

The easiest way to reallocate consists in finding the first suitable code (not fully unavailable, busy or with busy ancestors) ard allocate it to the new call. Busy codes within its subtree will then be allocated as usual incoming calls by the allocation algorithm.

The proposed reallocation algorithm does more: it aims at minimizing the number of needed reallocations, defined as changes of ongoing connections assigned codes, equivalently as number of removed codes to be reallocated as a consequence of the reallocation procedure.

As a first step, the new request should be assigned to an unavailable, but not busy code. Once this code is marked as busy (used), its used descendants have to be reallocated. This operation is logically preceding the actual allocation, since only free codes should be allocated to incoming calls.

The preferred code for the new allocation is the one that presents the lowest number of used codes in its subtree, i.e. the lowest number of descendants, which will assure a low number of reallocations.

If more than one subtree presents the sane minimum number of assigned codes, the one with lowest unavailability level should be preferred in order to have to move lower bit-rate codes, that have a higher probability to fit in the tree without needing further reallocations.

Actual reallocations of the subtree codes (codes handovers) are then performed following the same rules that apply or a new incoming call: if free codes of the corresponding level exist, according to the allocation algorithm, if no free code exists, according to the reallocation algorithm.

Since codes are reallocated through the same method as used for allocation, they could in turn trigger further nested reallocation procedures, and so on.

At should be noticed that through allocation and reallocation a new code request can always be satisfied, unless it exceeds the total capacity of the tree (in term of bit rate).

Figure 2:
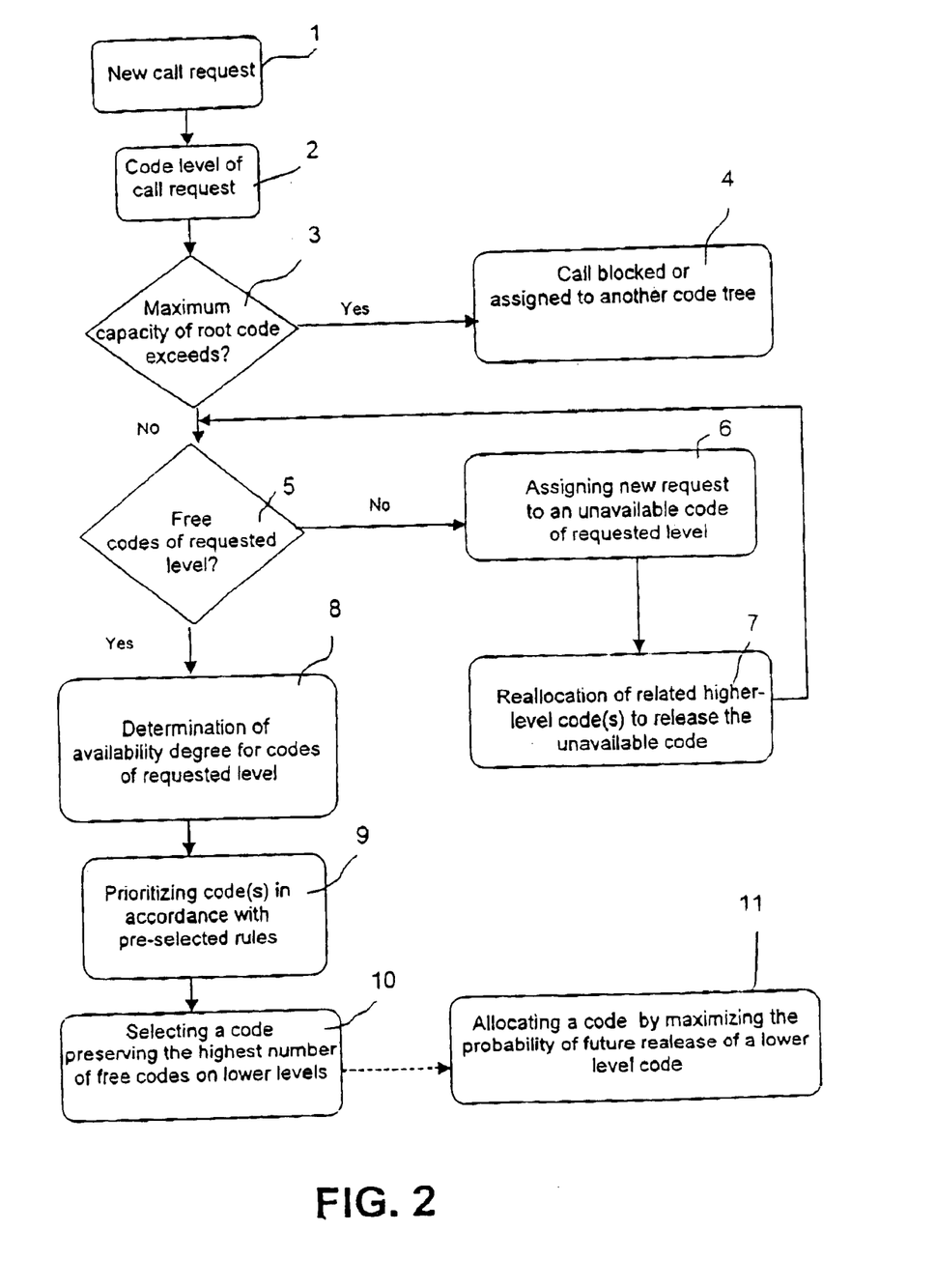
FIG. 2 is a flow diagram illustrating steps of the invention.
Figure 2B:
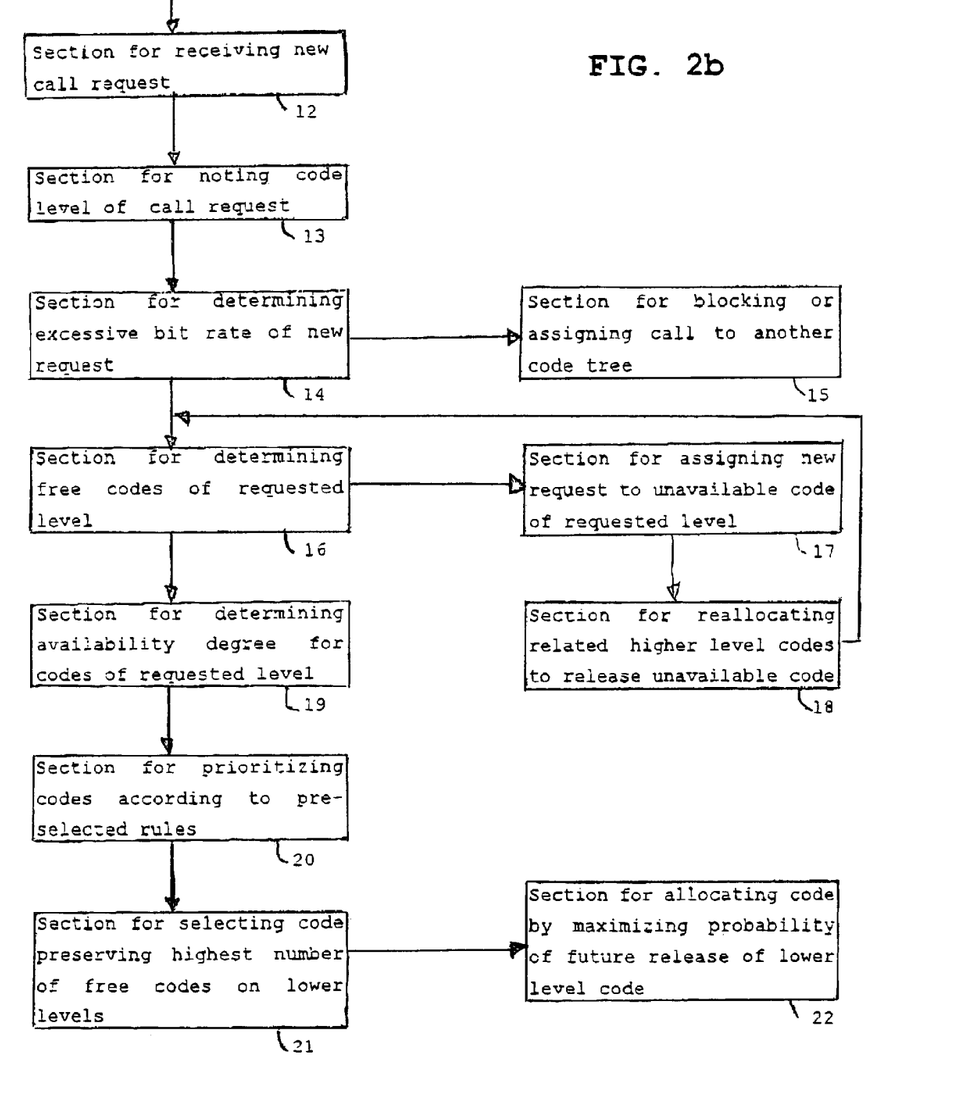
FIG. 2b is a block diagram illustrating system sections.

FIGS. 2 and 2b are a flow diagram and a system block diagram, respectively, for illustrating the principle of the invention. In step 1 an incoming request for allocation of a code for a spread information signal is received in a system section 12 for receipt of new call requests. In step 2 there is noted, in a system section 13 for noting code level of call request, a desired level k, or desired bit rate, for the signal code. The code of lowest level, i.e. the root code of the code tree, typically used in a cell of a cellular radio system, defines a total maximum transmission capacity for that cell, which should not be exceeded. Exceeding the total maximum bit rate would result in non-orthogonality between some codes and their consequent degradation. Call requests are blocked or assigned to additional code trees if the total already used bit rate plus the arriving call bit rate exceeds the total tree bit rate.

In step 3 there is determined, in a system section 14 for determining excessive bit rate of new request, whether allocation of a code for the incoming request would exceed the maximum total bit rate of the root code of the code tree. If yes, a system section 15 in step 4 performs blocking of the request or assignment thereof to another code tree, if available in the system. If no, i.e. it is considered in step 3 that the maximum total bit rate is not exceeded, the flow proceeds to step 5 and a system section 16 for determining free codes of requested level.

In step 5 there is thus determined whether there exist free codes of a desired level k. If no, reallocation is needed by assigning, by a system section 17, in step 6, a new request to an unavailable code of requested level. For this purpose, step 7 and system section 18 reallocates related higher level code(s) to release the unavailable code. In other words, the already assigned subtree codes relating to the unavailable code have to be changed to release the code of desired level k. The flow then returns to step 5 and system section 16.

In the reallocation procedure of the invention, the incoming request should be assigned to a preferred unavailable, but not busy, code in accordance with pre-selected rules, after which the used codes in its subtree have to be reallocated.

The reallocation is preferably done by an algorithm which aims at minimizing the number of needed reallocations. These reallocations are defined as changes of the assigned codes of connections in progress, or equivalently as the number of removed codes to be reallocated as a consequence of the reallocation procedure.

According to one embodiment of the present invention, the preferred unavailable code assigned by system section 17 in step 6 should be the one that has the lowest number of assigned codes n its subtree, i.e. the lowest number of related higher-level k codes, to prepare for a low number of reallocations, i.e. changes in the assigned codes in connections in progress. According to another embodiment, the preferred unavailable code might also be the one that has the lowest unavailability with respect to its subtree.

The best mode, in which the preferred unavailable code is the one that has the lowest number of assigned codes in its subtree, minimizes the number or cases in which reallocation is needed.

Reallocation of the subtree codes is then performed following the rules that apply for a new incoming request in accordance with steps 5–11, i.e. if free codes of the corresponding level exist, the allocation algorithm should be used, whereas, if no free code exists, the reallocation algorithm should be used.

If it is considered by system section 16 in step 5 that there is one free code of requested bit rate, that code will be allocated. If there exist more free codes of the desired level, step 8 in a system section 19 determines the availability degree for the codes of the requested level.

In order to select a code, step 8 is followed by step 9 in which prioritizing of code(s) is performed by a system section 20 for prioritizing in accordance with pre-selected rules. According to these rules, the highest possible number of lower level k available codes is preserved in step 10. Ir case several choices exist, probability of future release of a lower level code will be maximized in step 11 by a system section 22. This can be performed in accordance with pre-selected rules as in step 9.

The prioritizing of codes preserving the highest number of free codes on lower levels in step 10 may e.g. be performed by defining a set of available codes having fathers with highest unavailability levels, and by repeating the preceding step for code levels of successively earlier generations until the root code has been reached, and finally choosing the code from the resulting subset.

It should be noted that through allocation and reallocation a new code request can always be satisfied, unless it exceeds the total capacity of the tree in term of bit rate.

EXAMPLES

In the following examples 1–5, the invention is explained in connect on with some typical situations (cases 1–4). In all of FIGS. 3–7, black circles represent used codes, while light grey ones represent busy, but not used codes. A code is used if a request has been assigned to it. It car be busy without being used if one or its ancestors is used.

EXAMPLE 1

(Present Availability, Case 1)

Figure 3:
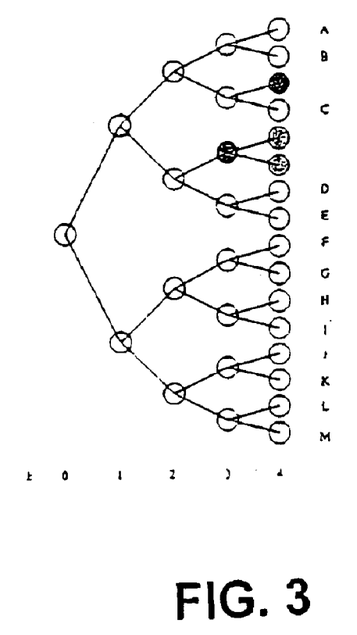
FIGS. 3–7 illustrate application of the algorithm of the invention in different hypothetical situations.

FIG. 3 presents a hypothetical situation, wherein OVSF codes are allocated for incoming requests. Five levels k of codes, said levels being numbered as 0, 1, 2, 3 and 4, are indicated in FIG. 3. Free codes in the highest level are identified by capital letters A–M.

An incoming request of level k=4 of the code tree of FIG. 3, according to steps 1 and 2 of FIG. 2 is now assumed. If the maximum total bit rate or the transfer capacity or the code tree is not exceeded, as determined in step 3, and there are free codes of the requested level as determined by step 5, the algorithm of the invention considers, in step 8, the unavailability level of each free code's father. The result thereof is that the unavailability level is ½ for C and zero for all the remaining free codes. This means that C will be chosen for assignment to achieve the aim in accordance with which the highest possible number or lower level available codes should be preserved as selected by step 10. This is the best solution in term of resulting free higher bit rate codes, which, in FIG. 3, is free codes on level k=3, 2 free codes on level k=2, 1 free code on level k=1. For the remaining possibilities to choose a higher level k code among F–M, there are 5 free codes on level k=3, 1 free code on level k=2 and 1 no free code on level k=1. For assignments A–B, there are 5 free codes on level k=3, 2 free codes on level k=2 ard 1 free code on level k=1.

EXAMPLE 2

(Future Availability, Case 2)

Figure 4:
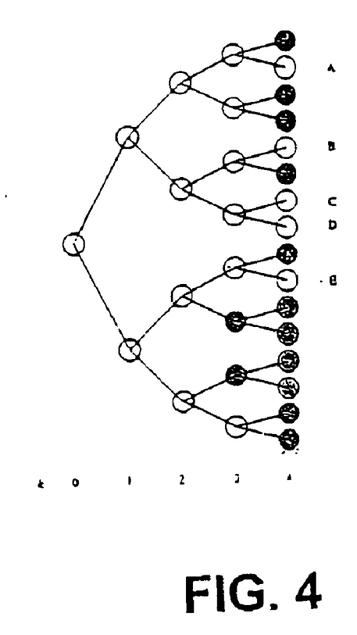

FIG. 4 presents another hypothetical situation, wherein OVSF codes are allocated for incoming requests. Five levels k of codes numbered as 0, 1, 2, 3 and 4 are indicated. Free codes in the highest level k are identified by capital letters A–E.

An incoming request of level k=4 is assumed according to steps 1 and 2 of FIG. 2. If the maximum bit rate or the transfer capacity of the code tree is not exceeded as determined by step 3 and there are free codes of the requested level as determined by step 5, the availability degree for the free codes are determined by step e. The OVSF tree of FIG. 4 presents 5 free codes on level k=4, which are A, B, C, D and E. Codes C and D have a free father (zero unavailability), so they should be discarded to leave as much higher bit rate codes free as possible as selected by step 10.

Codes A, B and E have "half" unavailable fathers, and therefore the algorithm considers their grand-father's unavailability, which is for codes A and E and ½ for code B. This last should then be discarded by step 10. Next, great grand-fathers (level k=1) should be considered. The ancestor of code A has unavailability 4/8, while the ancestor of code E has unavailability 7/8. Code E should then be allocated to the incoming request by step 11.

It is worth noting that codes A, B and E are equivalent from a higher level code availability point of view, in the sense that the same number of higher level free codes results from each assignment. In a preferred embodiment of the invention the allocation of a code is performed by step 11 by maximizing the probability of future release of a lower level code. The difference between codes A, B and E thus concerns the probability of a short term release of a presently unavailable lower-level code, that is maximized through the proposed choice by step 11.

EXAMPLE 3

(Reallocation, First Embodiment, Case 3)

Figure 5:
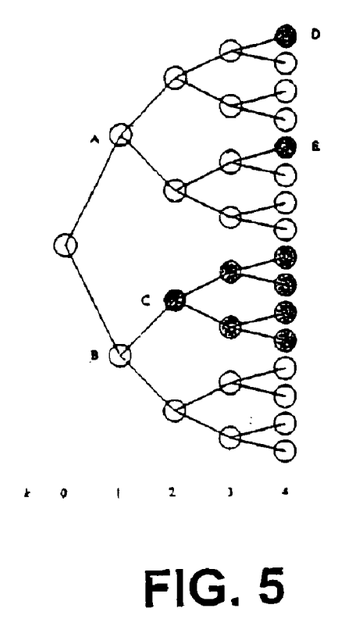

FIG. 5 presents still another hypothetical situation, wherein OVSF codes are allocated for incoming calls. An incoming request of level k=1 is row assumed to be allocated in steps 1 and 2 of FIG. 2. If the maximum total bit rate or the transfer capacity of the code tree is not exceeded, as determined by step 3, the availability degree of the codes of requested level is determined in step 5. Since according to this analysis no free codes are available, a reallocation algorithm is performed according to which one of the two unavailable codes, viz. A or B, has to be chosen by step 6 to be assigned for the incoming request. Code A has two used descendants, D and E of level k=4, while code B has only one used son, C of level k=2, so code B is preferred according to the rule of the present invention saying that reallocation should be performed by minimizing the number of changes of already allocated codes and that the preferred unavailable code is the one that has the lowest number of assigned related higher-level codes.

Figure 6:
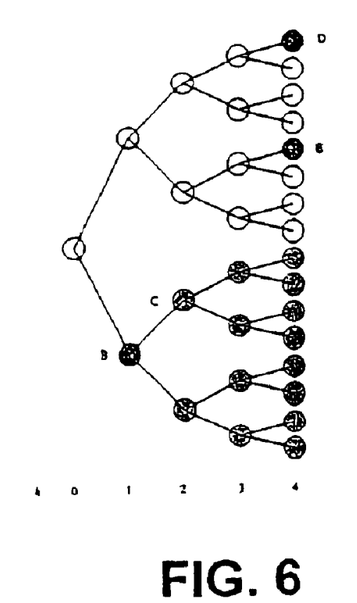

Once the choice of code B is done, the higher level code C has to be reallocated. The new situation is shown in FIG. 6. The reallocation request for performing the reallocation of code C of level k=2 is treated as an incoming request, viz. request from step 7 to step 5 in FIG. 2.

Since no free codes are available, once again the reallocation procedure is triggered, and one of the two unavailable level k=2 codes is chosen, indifferently in this case, since they have the same unavailability. One of the related level k=4 codes then has to be moved away from the subtree of the assigned code, and in turn be allocated as an ordinary incoming request. In this last assignment the reallocation of one of the level k=4 codes is performed so that they both are in the same subtree with respect to level k=2, which is not related to the reallocated code C, and preferably also in the same subtree with respect of k=3 to leave an extra level k=3 code free.

EXAMPLE 4

(Reallocation, Second Embodiment, Case 3)

Instead of using the reallocation method of example 3, a different reallocation procedure is used for the same situation as in example 3.

The reallocation now assumed chooses the lower unavailability level subtree. The unavailability for A is 2/8 and for B ½ (FIG. 5). In that case, code A would be chosen instead of code B, leading to no additional reallocation steps in addition to the reallocation of codes D and E.

However, two code changes (reallocations) would hare been needed, just as in the previous case, so assuming that indirect reallocation procedures do not determine additional setup delay (this assumption is justified by the possibility the base station has to perform internally all needed reallocation, and jest at the end issue the actual code change commands to involved mobile stations), the performance of the two reallocation algorithms in the above examples 3 and 4 is the same.

EXAMPLE 5

(Second Embodiment, Case 4)

Figure 7:
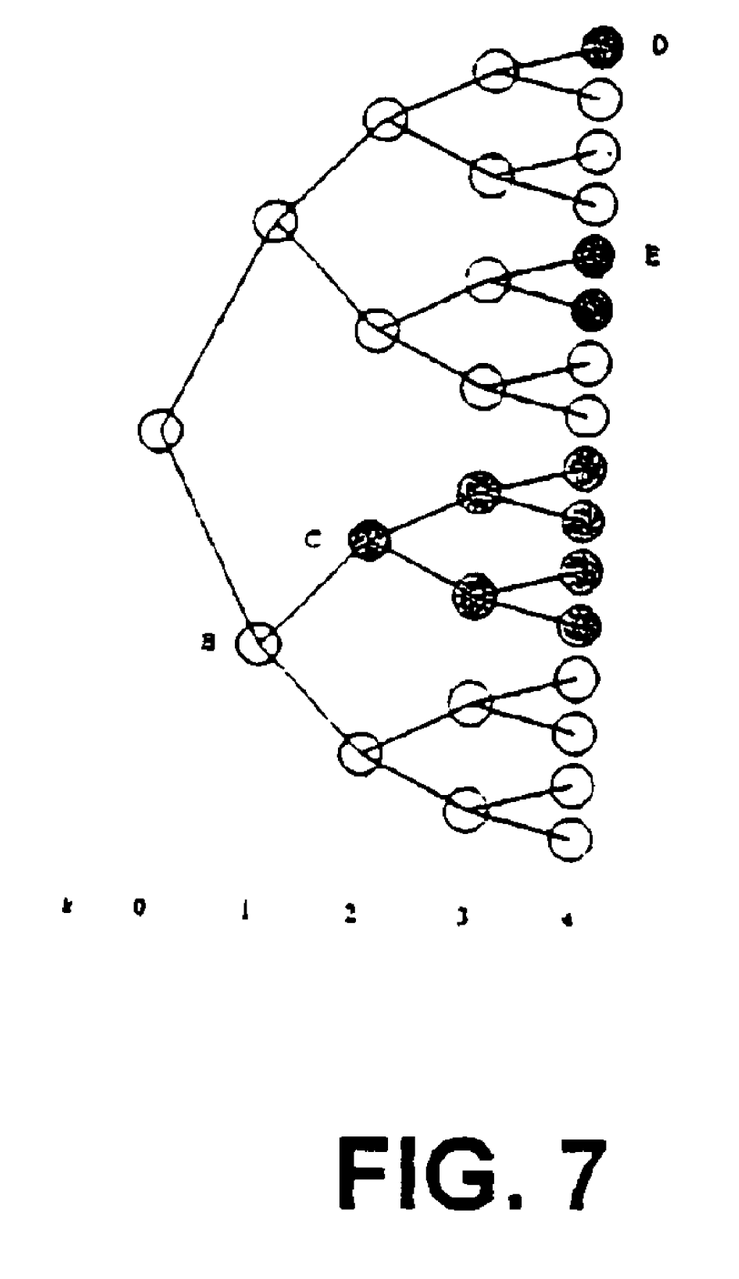

The second embodiment of the reallocation method of the invention is now used for the situation in FIG. 7.

As the allocating according to this embodiment is performed depending on the unavailability levels instead of the bare unweighted number of allocated codes as was done in the first embodiment in example 3, we would choose once again code A instead of B, for its unavailability level 3/8 is lower than that of code A having the unavailability level ½.

Indeed, this is not the better choice in this situation, since it determines three code changes (changing of codes D, E and F in FIG. 7), while only two would be needed choosing code B, i.e. using the proposed, bare number of codes based, algorithm according to the first embodiment.

The intention of two above examples is to illustrate how the proposed algorithm works, based on the number of used codes in the subtrees and to show that a possible alternative algorithm (based on the unavailability level of the subtrees instead) that performs in the same way in the situation depicted in example 3 may lead to additional unneeded code changes in other cases, such as in example 4.

A satisfactory solution is to choose the subtree with the lowest number of used codes and if more than one subtree has the same lowest number of used codes, choosing among that subset the one that has the lowest unavailability level.

Performance Evaluation

Simulations have been carried out to evaluate the improvement in code allocation performance of the proposed solution of the invention.

Different services have been considered, with Spreading factors ranging from 4 (384 kbps LCD (Long Constrained Delay Data) and 2048 kbps UDD (Unconstrained Delay Data)) to 128 (8 kbps Speech). Offered traffic statistics during simulation time (10000s) are reported in table 1.

Five different combinations of allocation and reallocation algorithms have been tested with the same offered traffic conditions. In the following the solution of the invention is called "proposed" and the solution of prior art is caller "sequential", referring to the sequential code allocation methods of the price art referred to in the section "Background Art", Tables 2, 3, 4 and 5 show the simulation results (service by service) respectively using sequential allocation and reallocation, sequential allocation and proposed reallocation, proposed allocation and sequential reallocation, proposed allocation and reallocation. In the method of the sequential allocation, the first free available code is assigned without any further rules.

In the first column, the number of allocations blocked due to lack of free space in the tree is reported. The number of requests that can be satisfied, eventually by reallocation follows. Since each request is served if and only if there is theoretical room in the tree (regardless of how free codes are distributed), and the offered traffic is the same (the same seeds for its random generation have been used), the number of blocked and admitted calls is the same for all cases. The simulations for the different algorithms were performed in the same conditions, not just statistically speaking, but in the same punctual conditions of tree operations. In the third column, the number of reallocations procedures can be found. Finally, in the fourth column, the total reallocations needed are presented.

The number of reallocation procedures represents how many times a new code request could not be satisfied picking up directly one free code from the tree, and a call to the reallocation algorithm was therefore unavoidable.

Keeping constant all other parameters, this value decreases as the performance of the allocation procedure improves.

From a system point of view, the number of reallocation procedures determines an average setup delay for the incoming calls due to the need for code changes.

On the other hand, assuming that all code changes can be performed simultaneously, the number of total reallocations is proportional to the generated signalling overhead.

Tables 6 and 7 show the comparisons in terms of number of reallocation procedures and total reallocations using the different algorithm combinations.

The improvement provided by the proposed algorithms is evident in term of both avoided reallocation procedures (and thus lower average setup delay) ard avoided code changes (and thus lower signalling overhead).

The solution of the invention, when both the allocation and reallocation is performed by using the algorithms of the invention, (P.A.P.R. is used) provides a decrease of the reallocation procedure of 45% (from about 4500 to about 2500), and correspondingly a decrease of the code charges of 74% (from about 13500 to about 3500) with respect to the sequential allocation and reallocation case of prior art.

The proposed allocation and reallocation algorithms of the invention determine the decrease to about one fourth of the number of code changes in a loaded system (compared to the simple sequential procedures of prior art), correspondingly reducing the involved signalling messages. This can be seen in table 8, comparing S.A.S.R. (total 13487) with P.A.P.R. (total 3507).

In the sane way, the number of reallocation procedures needed is almost reduced to a half, with positive impacts on setup delays due to code changes. The cost of the solution of the invention is likely to be represented only by a slight increase on the computational complexity needed at the base station as the base station anyway has to use some algorithm for the code allocation.

TABLE 1

Per service offered traffic statistics.

| k | SF | Sym. rate [kbps] | Service | Arrival rate [s⁻¹] | Mean st. time [s] |
|---|---|---|---|---|---|
| 0 | 1 | 4096 | LCD 2048 (4 k = 2 codes) | — | — |
| 1 | 2 | 2048 | — | — | — |
| 2 | 4 | 1024 | LCD 384-UDD 2048 | 0.0125 | 10 |
| 3 | 8 | 512 | UDD 384 | 0.025 | 10 |
| 4 | 16 | 256 | LCD 144 | 0.1 | 10 |
| 5 | 32 | 128 | UDD 144 | 0.4 | 10 |
| 6 | 64 | 64 | LCD 64-UDD 64 | 1.6 | 10 |
| 7 | 128 | 32 | Speech | 6.4 | 10 |
| 8 | 256 | 16 | CCPCH | — | — |

TABLE 2

Sequential allocation and reallocation (S.A.S.R.).

| K | SF | Blocked Requests | Admitted Requests | Reallocation Procedures | Total Reallocations |
|---|---|---|---|---|---|
| 2 | 4 | 105 | 7 | 7 | — |
| 3 | 8 | 142 | 106 | 99 | — |
| 4 | 16 | 288 | 714 | 610 | 38 |
| 5 | 32 | 535 | 3426 | 1779 | 458 |
| 6 | 64 | 1065 | 14875 | 1951 | 1839 |
| 7 | 128 | 2073 | 62091 | — | 11152 |
| Total | | 4208 | 81219 | 4446 | 13487 |

TABLE 3

Sequential allocation and proposed reallocation (S.A.P.R.).

| K | SF | Blocked Requests | Admitted Requests | Reallocation Procedures | Total Reallocations |
|---|---|---|---|---|---|
| 2 | 4 | 105 | 7 | 6 | — |
| 3 | 8 | 142 | 106 | 91 | — |
| 4 | 16 | 288 | 714 | 438 | 29 |
| 5 | 32 | 535 | 3426 | 1234 | 306 |
| 6 | 64 | 1065 | 14875 | 1798 | 1118 |
| 7 | 128 | 2073 | 62091 | — | 2925 |
| Total | | 4208 | 81219 | 3567 | 4378 |

TABLE 4

Proposed allocation and sequential reallocation (P.A.S.R.).

| K | SF | Blocked Requests | Admitted Requests | Reallocation Procedures | Total Reallocations |
|---|---|---|---|---|---|
| 2 | 4 | 105 | 7 | 7 | — |
| 3 | 8 | 142 | 106 | 92 | — |
| 4 | 16 | 288 | 714 | 382 | 39 |
| 5 | 32 | 535 | 3426 | 973 | 443 |
| 6 | 64 | 1065 | 14875 | 1265 | 1742 |
| 7 | 128 | 2073 | 62091 | — | 3737 |
| Total | | 4208 | 81219 | 2719 | 5961 |

TABLE 5

Proposed allocation and reallocation (P.A.P.R.).

| K | SF | Blocked Requests | Admitted Requests | Reallocation Procedures | Total Reallocations |
|---|---|---|---|---|---|
| 2 | 4 | 105 | 7 | 7 | — |
| 3 | 8 | 142 | 106 | 93 | — |
| 4 | 16 | 288 | 714 | 389 | 23 |
| 5 | 32 | 535 | 3426 | 896 | 263 |
| 6 | 64 | 1065 | 14875 | 1049 | 679 |
| 7 | 128 | 2073 | 62091 | — | 2542 |
| Total | | 4208 | 81219 | 2434 | 3507 |

TABLE 6

Simulation results - Number of reallocation procedures.

| | | Reallocation Procedures | | | |
|---|---|---|---|---|---|
| k | SF | S.A.S.R | S.A.P.R. | P.A.S.R. | P.A.P.R. |
| 2 | 4 | 7 | 6 | 7 | 7 |
| 3 | 8 | 99 | 91 | 92 | 93 |
| 4 | 16 | 610 | 438 | 382 | 389 |
| 5 | 32 | 1779 | 1234 | 973 | 896 |
| 6 | 64 | 1951 | 1798 | 1265 | 1049 |
| 7 | 128 | — | — | — | — |
| Total | | 4446 | 3567 | 2719 | 2434 |

TABLE 7

Simulation results - Total number of reallocations.

| | | Total Reallocations | | | |
|---|---|---|---|---|---|
| k | SF | S.A.S.R | S.A.P.R. | P.A.S.R. | P.A.P.R. |
| 2 | 4 | — | — | — | — |
| 3 | 8 | — | — | — | — |
| 4 | 16 | 38 | 29 | 39 | 23 |

TABLE 7-continued

Simulation results - Total number of reallocations.

| | | Total Reallocations | | | |
|---|---|---|---|---|---|
| k | SF | S.A.S.R | S.A.P.R. | P.A.S.R. | P.A.P.R. |
| 5 | 32 | 458 | 306 | 443 | 263 |
| 6 | 64 | 1839 | 1118 | 1472 | 679 |
| 7 | 128 | 11152 | 2925 | 3737 | 2542 |
| Total | | 13487 | 4378 | 5961 | 3507 |

What is claimed is:

1. A method for modulating an information signal in a telecommunication system, in which spreading codes are used for discriminating between user signals, said codes being allocated for incoming call requests by selecting them from one or more code structures having codes of different bit rates, comprising:

a) noting a desired bit rate of a code to be allocated for an incoming call request,
   b) determining the availability of codes having the desired bit rate;
   c) if there is one available code of the desired bit rate, allocating the one available code of the desired bit rate to said incoming call request; and
   d) if there is more than one code of the desired bit rate available, allocating a code in accordance with pre-selected rules so as to prioritize codes preserving the highest possible number of available higher bit rate codes and to maximize the probability of future release of a higher bit rate code.

2. The method of claim 1, further comprising:
   assigning the incoming request to another code structure if a transfer capacity would be exceeded.

3. The method of claim 1, further comprising:
   blocking an incoming call request if a transfer capacity would be exceeded by said incoming call request.

4. The method of claim 1, wherein codes are prioritized by:
   a) determining an unavailability of shorter length codes relating to available free codes of the desired bit rate,
   b) choosing the set of codes among the free codes having related shorter length codes with the highest degree of unavailability, and
   c) repeating the foregoing step for related shorter length codes until the root code is reached, and finally choosing a code from the resulting set of codes.

5. A method for modulating an information signal in a telecommunication system, in which spreading codes are used for discriminating between user signals, said codes being allocated for incoming call requests by selecting them from one or more code structures having codes of different bit rates, comprising:
   a) noting a rate of a code to be allocated for an incoming call request,
   b) determining an availability of one or more codes having the desired bit rate, and
   c) performing a code reallocation if no code of the desired bit rate is available by assigning the incoming request to an unavailable code and reallocating related, used lower bit rate codes to release the assigned unavailable code.

6. The method of claim 5, further comprising:
   choosing as a preferred unavailable code one minimizing the total number of code reallocations.

7. The method of claim 5, further comprising:
   choosing as a preferred unavailable code one having the lowest number of assigned lower bit rate codes.

8. The method of claim 5, further comprising:
   performing reallocation of used codes either by allocating or reallocating in accordance with the same rules as used for allocating codes to an incoming request.

9. The method of claim 5, further comprising:
   choosing as a preferred unavailable code one having a lowest degree of unavailability.

10. The method of claim 5, further comprising:
    choosing as a preferred unavailable code for reallocation one having the lowest number of assigned lower bit rate codes in its subtree, and, in case there is more than one such unavailable code, choosing one having a lowest unavailability level.

11. A system for modulating an information signal in a telecommunication system, in which spreading codes are used for discriminating between user signals, said codes being allocated for incoming call requests by selecting them from one or more code structures having codes of different bit rates, comprising:
    a) means for noting a desired bit rate of a code to be allocated for an incoming call request,
    b) means for determining the availability of codes having the desired bit rate,
    c) means for allocating the one available code of the desired bit rate if there is one available code of the desired bit rate to said incoming call request,
    d) means for allocating a code in accordance with pre-selected rules if there is more than one code of the desired bit rate available so as to prioritize codes preserving the highest possible number of available higher bit rate codes and to maximize a probability of future release of a higher bit rate code.

12. The system of claim 11, further comprising:
    means for assigning the incoming request to another code structure if a transfer capacity would be exceeded.

13. The system of claim 11, further comprising:
    means for blocking an incoming call request if a transfer capacity would be exceeded by said incoming call request.

14. The system of claim 11, further comprising means for prioritizing codes including:
    a) means for determining an unavailability degree of shorter length codes relating to available free codes of desired bit rate, and
    b) means for choosing the set of codes among the free codes having related shorter length codes with the highest unavailability degrees, and
    wherein the means for choosing chooses the set of codes among the free codes having related shorter length codes until the root code is reached, and finally chooses a code from the resulting set of codes.

15. A system for modulating an information signal in a telecommunication system, in which spreading codes are used for discriminating between user signals, said codes being allocated for incoming call requests by selecting them from one or more code structures having codes of different bit rates, comprising:
    a) means for noting a desired bit rate of a code to be allocated for an incoming call request, b) means for determining the availability of codes having the desired bit rate; and c) means for performing reallocating if no code of the desired bit rate is available by assigning the incoming request to an unavailable code, and reallocating related used lower bit rate codes to release the assigned unavailable code.

16. The system of claim 15, further comprising:

means for choosing as a preferred unavailable code one minimizing the total number of code reallocations.

17. The system of claim 15, further comprising:

means for choosing as a preferred unavailable code one having the lowest number of assigned lower bit rate codes.

18. The system of claim 15, further comprising:

means for performing reallocation of used codes either by allocating or reallocating in accordance with the same rules as used for allocating codes to an incoming request.

19. The system of claim 15, further comprising:

means for choosing as a preferred unavailable code one having a lowest degree of unavailability.

20. The system of claim 15, further comprising:

means for choosing as a preferred unavailable code for reallocation one having the lowest number of assigned lower bit rate codes in its subtree, and in case there is more than one such unavailable code, choosing one having a lowest unavailability level.

21. A computer program to be used in a telecommunication system, in which communication system a spreading code is used in the modulation to discriminate between user signals, the code being allocated from a set of codes of different levels in such a way that the highest possible number of higher bit rate codes are preserved, comprising a computer usable medium having computable readable code embodied therein to carry out the following:

a) noting a desired bit rate of a code to be allocated to an incoming call request;

b) determining an availability of the different codes having the desired bit rate;

c) if there is one available code of the desired bit rate, allocating the one available code of the desired bit rate to said incoming call request; and d) if there is more than one code of the desired bit rate available, allocating a code in accordance with pre-selected rules in such a way that the selection of a code to be allocated is performed so as to prioritize codes preserving the highest possible number available higher bit rates codes and to maximize the probability of future release of a higher bit rate code.

22. The computer program of claim 21, wherein the code is further embodied to carry out the steps of claim 2.

23. The computer program of claim 21, wherein the code is further embodied to carry out the steps of claim 3.

24. The computer program of claim 21, wherein the code is further embodied to carry out the steps of claim 4.

25. Apparatus for modulating an information signal in a telecommunication system, in which spreading codes are used for discriminating between user signals, said codes being allocated for incoming call requests by selecting them from one or more code structures having codes of different bit rates, comprising electronic circuitry configured to:

note a rate of a code to be allocated for an incoming call request, determine the availability of codes having the desired bit rate, and perform reallocating if no code of the desired bit rate is available by assigning the incoming request to an unavailable code and reallocating related, used lower bit rate codes to release the assigned unavailable code.

26. The apparatus of claim 25, the electronic circuitry further configured to:

choose as a preferred unavailable code one minimizing the total number of code reallocations.

27. The apparatus of claim 25, the electronic circuitry further configured to:

choose as a preferred unavailable code one having the lowest number of assigned lower bit rate codes.

28. The apparatus of claim 25, the electronic circuitry further configured to:

choosing as a preferred unavailable code one having a lowest degree of unavailability.

29. The apparatus of claim 25, the electronic circuitry further configured to:

choose as a preferred unavailable code for reallocation one having the lowest number of assigned lower bit rate codes in a code subtree, and in case there are more than one such unavailable code, choosing one having a lowest unavailability level.

30. A system for modulating an information signal in a telecommunication system, in which spreading codes are used for discriminating between user signals, said codes being allocated for incoming call requests by selecting them from one or more code structures having codes of different bit rates, comprising electronic circuitry configured to:

note a desired bit rate of a code to be allocated for an incoming call request, determine an availability of codes having the desired bit rate, if there is one available code of the desired bit rate, allocate the one available code of the desired bit rate, and if there is more than one code of the desired bit rate available, allocate a code in accordance with pre-selected rules so as to prioritize codes preserving the highest possible number of available higher bit rate codes and to maximize the probability of future release of a higher bit rate code.

* * * * *